(12) United States Patent
Hamann et al.

(10) Patent No.: US 8,521,449 B2
(45) Date of Patent: Aug. 27, 2013

(54) THREE DIMENSIONAL AIR FLOW SENSORS FOR DATA CENTER COOLING

(75) Inventors: Hendrik F. Hamann, Yorktown Heights, NY (US); Levente Klein, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 554 days.

(21) Appl. No.: 12/479,797

(22) Filed: Jun. 6, 2009

(65) Prior Publication Data

US 2010/0312498 A1 Dec. 9, 2010

(51) Int. Cl.
*G01F 1/00* (2006.01)
*G01F 1/68* (2006.01)

(52) U.S. Cl.
USPC ............ 702/45; 73/202.5; 73/204.13; 73/861

(58) Field of Classification Search
USPC ................... 702/45; 73/861, 202.15, 202.5
See application file for complete search history.

(56) References Cited

U.S. PATENT DOCUMENTS

| | | | | |
|---|---|---|---|---|
| 3,768,308 A * | 10/1973 | Neradka | ................. | 73/170.14 |
| 4,047,432 A * | 9/1977 | Fussell, Jr. | ................. | 73/861.22 |
| 4,220,950 A * | 9/1980 | Clark et al. | ................. | 340/594 |
| 4,334,186 A * | 6/1982 | Sasayama et al. | ............ | 323/365 |
| 4,478,076 A * | 10/1984 | Bohrer | ................. | 73/204.16 |
| 4,487,063 A * | 12/1984 | Hopper | ................. | 73/204.19 |
| 4,506,553 A | 3/1985 | Bruce et al. | | |
| 4,561,303 A * | 12/1985 | McCarthy | ................. | 73/204.24 |
| 4,709,581 A * | 12/1987 | Nishimura et al. | ............. | 73/202 |
| 4,744,246 A * | 5/1988 | Busta | ................. | 73/204.26 |
| 4,787,251 A | 11/1988 | Kolodjski | | |
| 5,134,890 A * | 8/1992 | Abrams | ................. | 73/861.52 |
| 5,357,795 A * | 10/1994 | Djorup | ................. | 73/170.12 |
| 5,948,975 A * | 9/1999 | Mueller et al. | ............. | 73/114.32 |
| 6,237,426 B1 | 5/2001 | Gryc et al. | | |
| 6,279,393 B1 * | 8/2001 | McLaughlin | ............. | 73/170.14 |
| 6,532,829 B1 | 3/2003 | Franklin | | |
| 6,928,884 B1 | 8/2005 | Pearson | | |
| 7,243,556 B2 | 7/2007 | Gryc et al. | | |
| 7,337,661 B2 * | 3/2008 | Yamada et al. | ............. | 73/204.26 |
| 2003/0182998 A1 * | 10/2003 | Goto et al. | ................. | 73/204.21 |
| 2006/0168975 A1 * | 8/2006 | Malone et al. | ................. | 62/180 |
| 2007/0032979 A1 * | 2/2007 | Hamann et al. | ............. | 702/130 |
| 2007/0062685 A1 * | 3/2007 | Patel et al. | ................. | 165/247 |
| 2007/0214886 A1 * | 9/2007 | Sheynblat | ................. | 73/509 |

OTHER PUBLICATIONS

P. Vettiger et al., "The "Millipede"—More Than One Thousand Tips for Future AFM Data Storage," IBM Journal of Research and Development, vol. 44, No. 3 (2000).
J.P. Holmes, "Heat transfer" McGraw Hill Book Company, pp. 240-249, 1992.

* cited by examiner

*Primary Examiner* — Jonathan C Teixeira Moffat
*Assistant Examiner* — Regis Betsch
(74) *Attorney, Agent, or Firm* — Vazken Alexanian; Michael J. Chang, LLC (57) ABSTRACT

Techniques for airflow analysis are provided. In one aspect, a mobile sensing device is provided. The mobile sensing device includes an airflow sensing system having a plurality of airflow sensing units arranged in a grid. Each airflow sensing unit includes a first air passage that contains at least one first airflow sensor; a second air passage perpendicular to the first air passage, wherein the second air passage contains at least one second airflow sensor; and a third air passage perpendicular to the first air passage and the second air passage, wherein the third air passage contains at least one third airflow sensor.

21 Claims, 10 Drawing Sheets

| V(m/s) AIR FLOW VELOCITY | Re REYNOLDS's NUMBER | Nu NUSSELT NUMBER | h(W/m²C) CONVECTION HEAT TRANSFER NUMBER | P(W) DISSIPATED POWER DUE TO COOLING | TEMPERATURE CHANGE (C) | RESISTANCE CHANGE (Ω) |
|---|---|---|---|---|---|---|
| 0.1 | 0.04545 | 0.14226 | 310.1228 | 1.85019E-4 | 18.50193 | 23.12 |
| 0.2 | 0.09091 | 0.1965 | 428.3647 | 2.55562E-4 | 25.55624 | 31.87 |
| 0.4 | 0.18182 | 0.27142 | 591.68921 | 3.53002E-4 | 35.30018 | 44.12 |
| 0.6 | 0.27273 | 0.32787 | 714.74673 | 4.26418E-4 | 42.64179 | 53.25 |
| 0.8 | 0.36364 | 0.3749 | 817.28519 | 4.87592E-4 | 48.75923 | 60.87 |
| 1 | 0.45455 | 0.41598 | 906.84632 | 5.41025E-4 | 54.10245 | 67.62 |
| 1.2 | 0.54545 | 0.45287 | 987.2614 | 5.89E-4 | 58.90002 | 73.62 |
| 1.4 | 0.63636 | 0.4866 | 1060.78986 | 6.32867E-4 | 63.28672 | 79.1 |
| 1.6 | 0.72727 | 0.51784 | 1128.89515 | 6.73499E-4 | 67.34988 | 84.12 |
| 1.8 | 0.81818 | 0.54706 | 1192.58868 | 7.11498E-4 | 71.14984 | 88.87 |
| 2 | 0.90909 | 0.57459 | 1252.60365 | 7.47303E-4 | 74.73033 | 93.3 |

THREE DIMENSIONAL AIR FLOW SENSORS FOR DATA CENTER COOLING

FIELD OF THE INVENTION

The present invention relates to airflow analysis, and more particularly, to techniques for making three dimensional airflow measurements in a room, such as a data center.

BACKGROUND OF THE INVENTION

In data centers, heat is generated by continuous and simultaneous operation of a large number of computing unit racks. Air cooling the whole room containing the data center is the most common method used to maintain thermal operating conditions in the data center. However, as data centers become increasingly larger in size, cooling them becomes more of a challenge. Thus, efficient heat dissipation and removal techniques have been pursued to reduce electrical power usage and to optimize operating performance.

Advances such as mobile measurement technology (MMT) have been proposed to measure temperature distributions and air flow in data centers to locally detect and cool areas with temperatures well above a desired level. See, for example, U.S. Pat. No. 7,366,632, issued to Hamann et al., entitled "Method and Apparatus for Three-Dimensional Measurements" (hereinafter "Hamann"), the contents of which are incorporated by reference herein. With MMT, a temperature sensor grid mounted on a cart is used to map out three dimensional temperature distributions in the data center. The sensors are mounted at various heights from the ground and lateral locations with spacing less than a foot apart.

A similar concept of sensor distribution on a grid is employed for air flow measurements inside the data centers. However, air movement is generally characterized by both airflow velocity and direction, making it a complex measurement since air direction can continuously change due to factors such as multiple cold air inlets combined with airflow from local fans mounted on computing units. For example, air is blown in various directions as the fans are usually positioned facing the hot spots in the room, and the air inlets redirect the airflow.

Therefore, improved techniques to measure airflow in a data center which are preferably compatible with MMT technology would be desirable.

SUMMARY OF THE INVENTION

The present invention provides techniques for airflow analysis. In one aspect of the invention, a mobile sensing device is provided. The mobile sensing device includes an airflow sensing system having a plurality of airflow sensing units arranged in a grid. Each airflow sensing unit includes a first air passage that contains at least one first airflow sensor; a second air passage perpendicular to the first air passage, wherein the second air passage contains at least one second airflow sensor; and a third air passage perpendicular to the first air passage and the second air passage, wherein the third air passage contains at least one third airflow sensor.

In another aspect of the invention, a method for mapping the airflow of a room (e.g., a data center) by taking airflow measurements of the room is provided. The method includes the following steps. A mobile sensing device is placed at an initial location in the room, the mobile sensing device includes an airflow sensing system having a plurality of airflow sensing units arranged in a grid, each airflow sensing unit including a first air passage that contains at least one first airflow sensor; a second air passage perpendicular to the first air passage, wherein the second air passage contains at least one second airflow sensor; and a third air passage perpendicular to the first air passage and the second air passage, wherein the third air passage contains at least one third airflow sensor. Airflow direction and velocity are measured using the mobile sensing device. The mobile sensing device is moved to another location in the room. The measuring and moving steps are repeated to obtain airflow measurements throughout the room thereby mapping the airflow of the room.

In yet another aspect of the invention, a method for airflow analysis in a room is provided. The method includes the following steps. Airflow direction and velocity measurements are obtained for a given location in the room from a mobile sensing device having an airflow sensing system having a plurality of airflow sensing units arranged in a grid, each airflow sensing unit including a first air passage that contains at least one first airflow sensor; a second air passage perpendicular to the first air passage, wherein the second air passage contains at least one second airflow sensor; and a third air passage perpendicular to the first air passage and the second air passage, wherein the third air passage contains at least one third airflow sensor. Airflow direction and velocity are determined between two neighboring points iteratively to determine an overall air path between any two points in the room. The obtaining and determining steps are repeated for n number of locations throughout the room to map airflow in the entire room.

A more complete understanding of the present invention, as well as further features and advantages of the present invention, will be obtained by reference to the following detailed description and drawings.

DETAILED DESCRIPTION OF PREFERRED EMBODIMENTS

Figure 1:
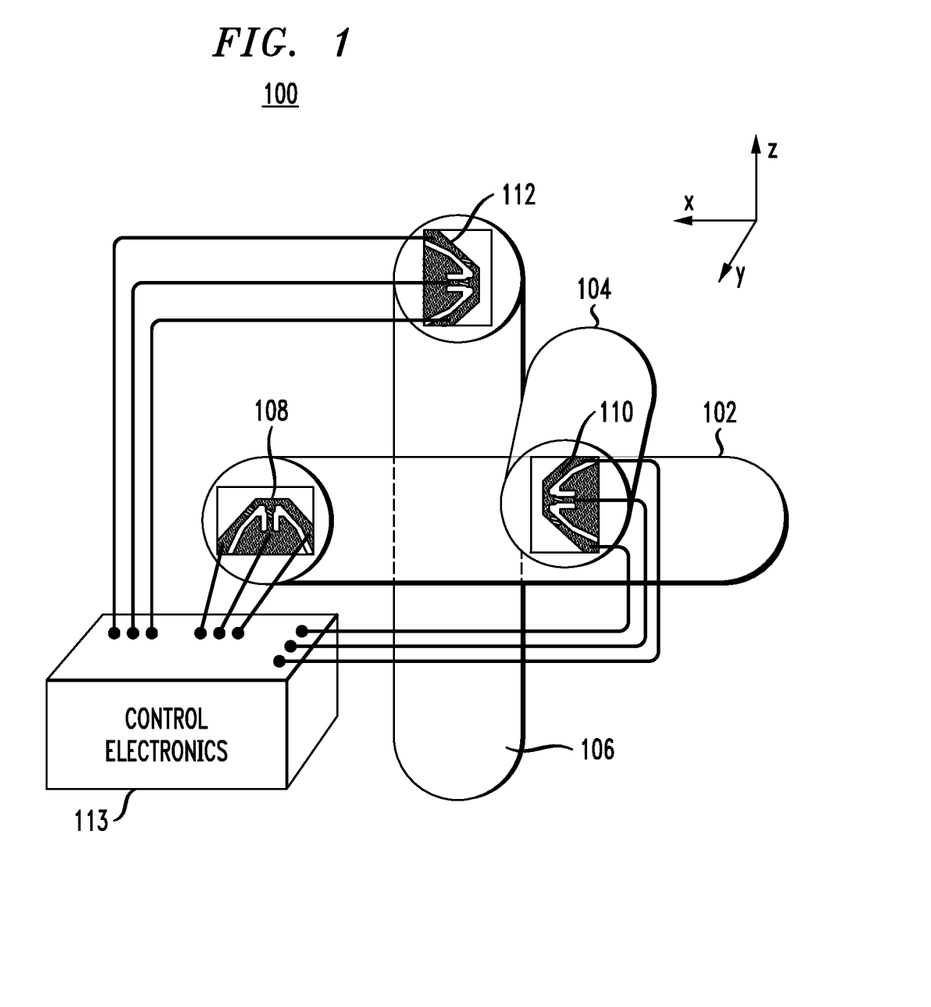
FIG. 1 is a diagram illustrating an exemplary airflow sensing unit according to an embodiment of the present invention.

FIG. 1 is a diagram illustrating exemplary airflow sensing unit 100. Airflow sensing unit 100 comprises a first air passage 102, a second air passage 104 and a third air passage 106. As shown in FIG. 1, air passage 102 and air passage 104 are perpendicular to one another, and air passage 106 is perpendicular to air passage 102 and air passage 104. By way of example only, if air passage 102 is positioned along an x-axis and air passage 104 is positioned along a y-axis, then air passage 106 would be positioned along a z-axis. According to an exemplary embodiment, the air passages include tubes that constrain air flow along a predefined direction. The tubes are separate from one another, with one tube for each direction. When the air passages include tubes, each tube should have a large enough diameter to be able to sample airflow velocity without disturbing the airflow (in a laminar flow regime). The diameter of the tube will determine the resolution, i.e., how fine a sampling of the airflow is taken (the narrower the tube the finer the sample, but if the tube is too narrow the airflow becomes turbulent and stops). Thus, the tubes should have a diameter which still permits laminar airflow therethrough. In one exemplary embodiment, each tube has a diameter of from about 0.1 centimeters (cm) to about five cm.

Each air passage contains an airflow sensor. Specifically, air passage 102 contains first airflow sensor 108, air passage 104 contains second airflow sensor 110 and air passage 106 contains third airflow sensor 112. Airflow sensors will be described in detail below. However, in general, the airflow sensors described herein are configured to detect airflow velocity. That coupled with the fact that the sensors are contained within the air passages that sample airflow from a particular direction (see below), permits the present airflow sensing unit to ascertain both airflow direction and velocity. Thus, for example, as highlighted above, when the first, second and third air passages are positioned along an x-axis, a y-axis and a z-axis, respectively, then the first airflow sensor can detect airflow direction and velocity along the x-axis, the second airflow sensor can detect airflow direction and velocity along the y-axis and the third airflow sensor can detect airflow direction and velocity along the z-axis. As such, each of the first, second and third airflow sensors independently samples airflow in a given direction. The air stream (through the air passages) has to be perpendicular to legs of the airflow sensors on which heaters are fabricated (see description of airflow sensors below) such that heat is carried from one heater to the other to have directional information. Accordingly, the proper positioning of the airflow sensors in the air passages is shown in FIG. 1. For measuring airflow velocity the orientation of the airflow sensors in the air passages does not matter. Further, while the embodiment shown illustrated in FIG. 1 depicts a single sensor being used for each air passage, this configuration is merely exemplary. For example, multiple sensors (e.g., a pair of sensors) may be used in a given air passage (see below). Control electronics, represented schematically by box 113, are used to control the airflow sensors, take readings from the airflow sensors and/or store and process airflow data obtained from the airflow sensors. According to an exemplary embodiment, the control electronics are present in the form of an apparatus such as apparatus 1200 of FIG. 12 (described below) configured to serve as the control electronics for the airflow sensors. Further, an airflow sensing system will be described in detail below that includes a plurality of airflow sensing units (arranged in a grid). In that system, a single such apparatus 1200 can serve as the common control electronics for all of the airflow sensors (and respective airflow sensing units) in the system.

As will be described in detail below, an array of airflow sensing units 100 can be used to detect airflow direction and velocity throughout a room, such as a data center. This is accomplished by the airflow sensing units sampling the airflow at various height levels and lateral locations throughout the room.

Figure 2:
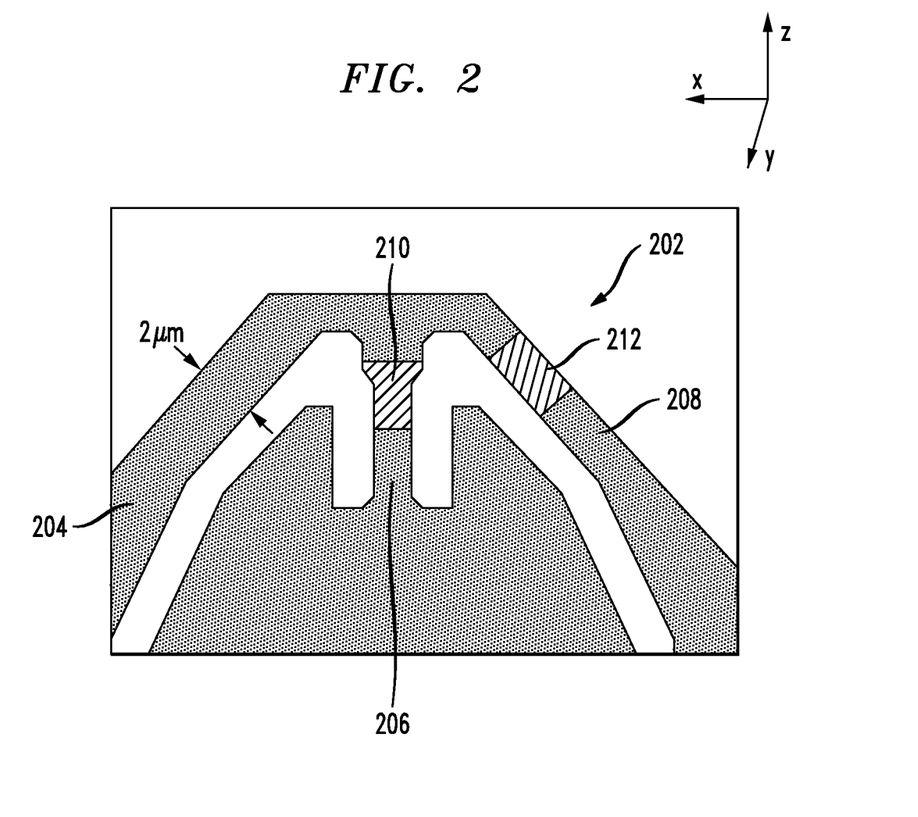
FIG. 2 is a diagram illustrating an exemplary airflow sensor according to an embodiment of the present invention.

FIG. 2 is a diagram illustrating exemplary airflow sensor 202. Airflow sensor 202 is representative of any one of first airflow sensor 108, second airflow sensor 110 and third airflow sensor 112 described in conjunction with the description of FIG. 1, above. Airflow sensor 202 is a type of thermal micro electro mechanical sensor (MEMS), also known as a "millipede tip" because the tip of the sensor branches into multiple legs 204, 206 and 208. As shown in FIG. 2, each leg is about two micrometers (μm) wide. Two of the legs, i.e., legs 206 and 208, contain heaters, i.e., heaters 210 and 212, respectively. MEMS will be described in detail below. In general, however, as the temperature of the heaters increases so does sensor resistance. Conversely, as the heaters are cooled down, for example, by airflow over the heaters, sensor resistance decreases. Thus readings can be taken by measuring the current flowing through the sensors (which changes based on the rate of airflow over the sensors). Further, as will be described in detail below, directional airflow analysis can be conducted using a differential resistance between the heaters.

To extract directional airflow information through a given air passage (see above) a differential measurement of cooling on both heaters may be performed. By way of example only, the central leg (leg 206) of the millipede tip with heater 210 can be used as a main sensing element, and can be incorporated into a constant temperature feedback loop. The lateral leg (leg 208) of the millipede tip with heater 212 can be used as a lateral sensing element, and can be powered at constant voltage. During sensing, heaters 210 and 212 are raised to the same temperature and airflow measurements are made across heaters 210 and 212 (main and lateral sensing elements, respectively). A difference between the readings from heaters 210 and 212 (obtained, e.g., by subtracting the readings from heaters 210 and 212) changes depending on the airflow direction.

Take as an example an airflow along the x-axis. When air flows from left to right (i.e., along the x-axis), heater 210 in the center of the sensor is cooled down more than heater 212 on a side of the sensor as the removed heat from the central heater (heater 210) is carried toward the side heater (heater 212). This additional heat carried toward the side heater reduces the temperature drop on the side heater less than would be expected from cooling due to airflow across the side heater. In the case of airflow from right to left, both heaters 210 and 212 are cooled down similarly. The heat carried to the central heater (heater 210) does not affect its reading because, as described above, heater 210 can be incorporated into a constant temperature feedback circuit that maintains a constant temperature and thus is less influenced by heat transported from the side heater (heater 212).

Figure 3A:
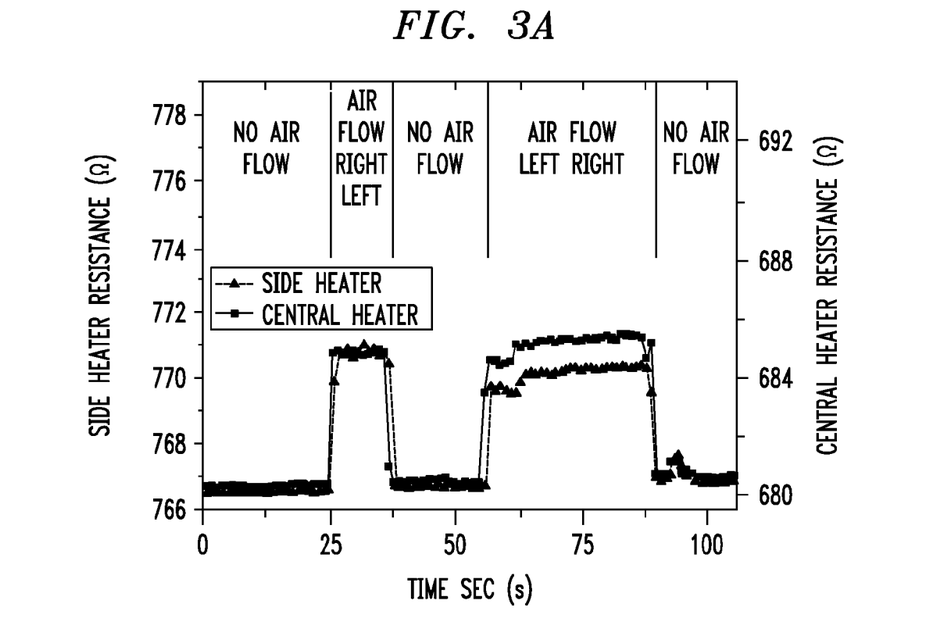
FIG. 3A is a graph illustrating differential resistance between two heaters in a sensor based on directional airflow according to an embodiment of the present invention.
Figure 3B:
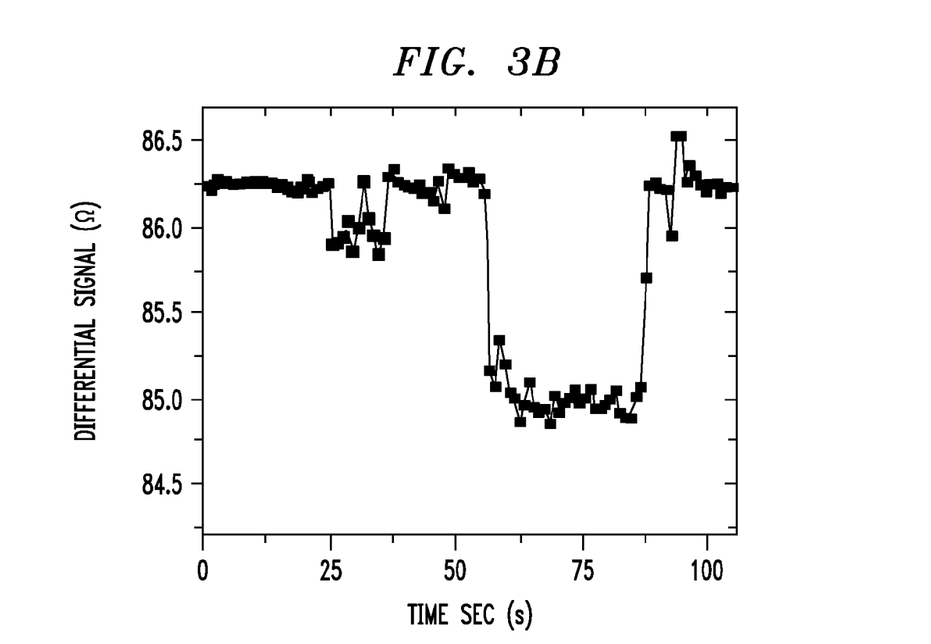
FIG. 3B is a graph illustrating a differential signal obtained based on the differential resistance between the two heaters of FIG. 3A according to an embodiment of the present invention.

FIG. 3A is a graph illustrating differential resistance between the two heaters in a sensor such as heaters 210 (central) and 212 (side) in sensor 202 (see FIG. 2, described above) based on directional airflow. Namely, in FIG. 3A, time (measured in seconds (s)) is plotted on the x-axis and resistance (measured in ohms (Ω)) of a side heater and a central heater are plotted on the y-axis. FIG. 3B is a graph illustrating a differential signal (e.g., in the form of measured current flow through the sensor) obtained based on the differential resistance between the two heaters of FIG. 3A. In FIG. 3B, time (measured in s) is plotted on the x-axis and differential signal (measured in ohms (Ω)) is plotted on the y-axis. It is notable from FIGS. 3A and 3B that the differential signal drop was much greater when a directional airflow from left to right was present than when a directional airflow from right to left was present. Thus, with the exemplary implementation shown in FIGS. 1 and 2, both airflow direction and velocity can be extracted.

Figure 4:
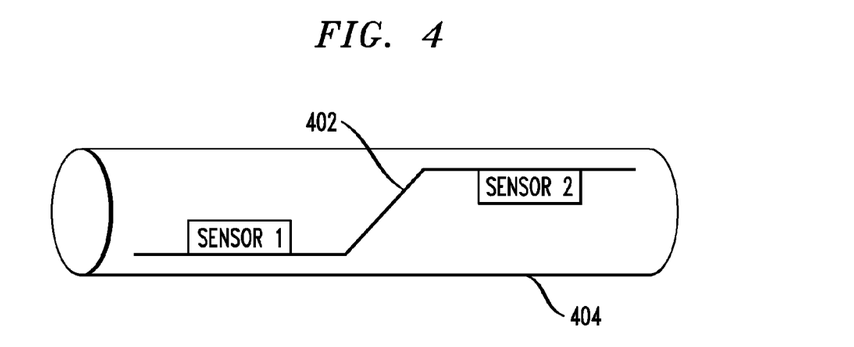
FIG. 4 is a diagram illustrating an air passage configuration employing a tilted blocking bar to measure both airflow direction and velocity according to an embodiment of the present invention.

Alternatively, directional airflow information can also be obtained using a blocking bar, or baffle in the air passages to direct air flowing in a particular direction to a particular sensor. This configuration uses multiple sensors for a given air passage (see FIG. 4). FIG. 4 is a diagram illustrating an air passage configuration employing a tilted blocking bar to measure both airflow direction and velocity. As shown in FIG. 4, a pair of sensors (labeled "Sensor 1" and "Sensor 2") is positioned on tilted blocking bar 402 that is inserted into air passage 404. Sensors 1 and 2 schematically represent, e.g., millipede tip sensors, such as airflow sensor 202 (see FIG. 2, described above), and air passage 404 represents any one of the air passages described herein, such as anyone of air passages 102, 104 or 106 (see FIG. 1, described above).

With this exemplary configuration, depending on the direction of airflow one of the sensors will sense the airflow while the other sensor will be idle. For example, using the orientation shown in FIG. 4, when the direction of the airflow is from left to right Sensor 1 will sense the airflow and Sensor 2 will be idle. Conversely, when the direction of the airflow is from right to left Sensor 2 will sense the airflow and Sensor 1 will be idle. Thus, the direction of the airflow can be ascertained simply by knowing which sensor is sensing the airflow and which sensor is idle. Thus, with the exemplary implementation shown in FIG. 4, both airflow direction and velocity can be extracted.

Figure 5:
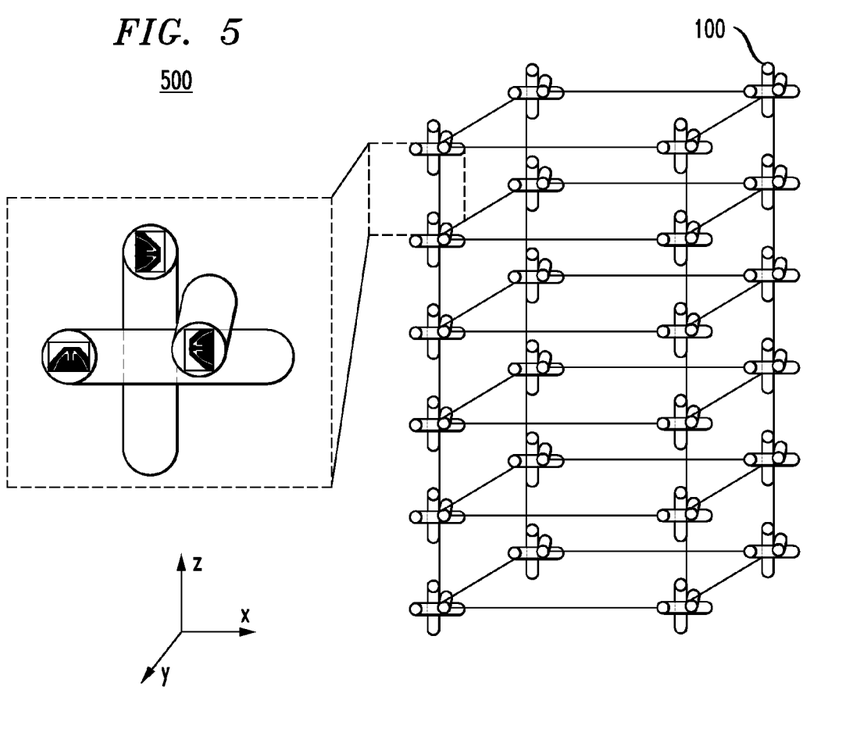
FIG. 5 is a diagram illustrating an exemplary airflow sensing system according to an embodiment of the present invention.

FIG. 5 is a diagram illustrating exemplary airflow sensing system 500. Airflow sensing system 500 comprises a plurality of airflow sensing units, such as airflow sensing unit 100 described, for example, in conjunction with the description of FIG. 1, above, arranged in a grid. As will be described in detail below, the airflow sensing units can be mounted on a metal grid structure thus forming a grid-like arrangement of the airflow sensing units. In the exemplary configuration shown illustrated in FIG. 5, all of the airflow sensing units have a same orientation (along the x-, y- and z-axes) as one another. This is however not a requirement and, in fact, it may be advantageous in some situations to vary the orientation of some of the sensing units (relative to other units). According to an exemplary embodiment, the grid is mounted on wheels, like an MMT cart (see, for example, Hamann), and is thus mobile. Such a mobile design is advantageous, for example, because it permits large areas of a room (data center) to be surveyed in a relatively short period of time. Further, MMT technology can be incorporated into the design to allow for monitoring a position of the airflow sensing system during the survey, enabling data collected to be accurately associated with an appropriate location(s) in the data center (see, for example, Hamann).

As shown in FIG. 5, airflow sensing units are mounted at different height levels and lateral locations on the grid. As described above, an airflow sensing unit comprises three airflow sensors, each of which can measure airflow velocity for airflow in a particular direction. Thus, every airflow sensing unit location on the grid comprises three sensors that measure the airflow along three dimensions (i.e., along the x-, y- and z-axes). As highlighted above, to be sensitive to airflow along only one direction, each airflow sensor is encapsulated inside an air passage (e.g., a tube) to sample the direction and velocity of the airflow.

By measuring the airflow along three directions for a single point on the grid, the airflow at that point can be reconstructed by adding all three components. This is similar to knowing vector components and determining the vector direction and magnitude (see FIG. 11, described below).

For ease of depiction, the grid shown in FIG. 5 comprises only 24 airflow sensing units, i.e., on six levels with four units per level. However, to attain more detailed readings, in some instances more airflow sensing units may be needed. For example, an exemplary grid configuration may comprise airflow sensing units in at least 100 different locations on the grid, e.g., situated on 10 different level heights with 10 different lateral locations at each level. Thus, in every location there would be three airflow sensors to detect the direction and magnitude of the airflow. The total number of sensors employed would be around 300 and would assure that the data is sampled in enough points to allow for a high resolution airflow mapping of the room.

There are a few requirements that should be met by the airflow sensors. First, in order to integrate a large number of sensors, e.g., 300 sensors, on a mobile grid each sensor should be small and have a small weight. Thus, when 300 or so airflow sensing units are integrated on a grid with wheels, the grid can be moved by a person without any effort. Second, the sensors should be sensitive to airflow with velocity distribution across a large range (e.g., from about one cm/s to about five meters (m)/s, which is a typical airflow velocity range encountered in data centers). Third, the power consumption for the sensor array should be minimal in order to be deployable in a mobile system (see below).

As described above, suitable airflow sensors for use in the present teachings include thermal MEMS, also known as "millipede tips." MEMS generally have a size that is less than five millimeters (mm)×five mm, e.g., one mm×three mm, and a very large thermal resistance. MEMS have been used as thermo-mechanical recording devices. See, for example, P. Vettiger, et al., "The "Millipede"—More Than One Thousand Tips For Future AFM Data Storage," IBM Journal of Research and Development, vol. 44, No. 3 (2000), the contents of which are incorporated by reference herein.

MEMS consist of doped silicon beams that have a low doped region (20 μm)×20 μm and their design is optimized for large thermal resistance (i.e., over 1,000,000 Kelvin per Watt (K/W)) and low power consumption (e.g., less than about two milliwatts (mW)). According to the present teachings, the airflow sensors, e.g., MEMS, are operated by connecting the sensors to a constant voltage source (which causes the heaters in the sensors to heat up) and measuring the current flowing through the sensors (which changes based on the rate of airflow over the sensors, see below). Both the applied electrical voltage and current are monitored (e.g., by control electronics 113 in FIG. 1).

In one approach, the sensors are operated in constant power mode which allows a constant temperature during operation. The temperature (resistance) of the sensors can be determined by knowing the supplied power and the thermal resistance of the sensor. Maintaining a constant power in circuit allows the temperature of the sensors to be increased up to about 450 degrees Celsius (° C.). The very large thermal resistance assures that airflow across the sensors will cause large heat dissipation (forced convective cooling) and will cool the sensors off easily. The cooling causes a drop in sensor resistance. This change in sensor resistance can be detected by monitoring by an electric circuit (e.g., control electronics 113 in FIG. 1). Resistance change is proportional to the airflow velocity (i.e., for a higher velocity airflow the resistance drop would be larger).

Figure 6:
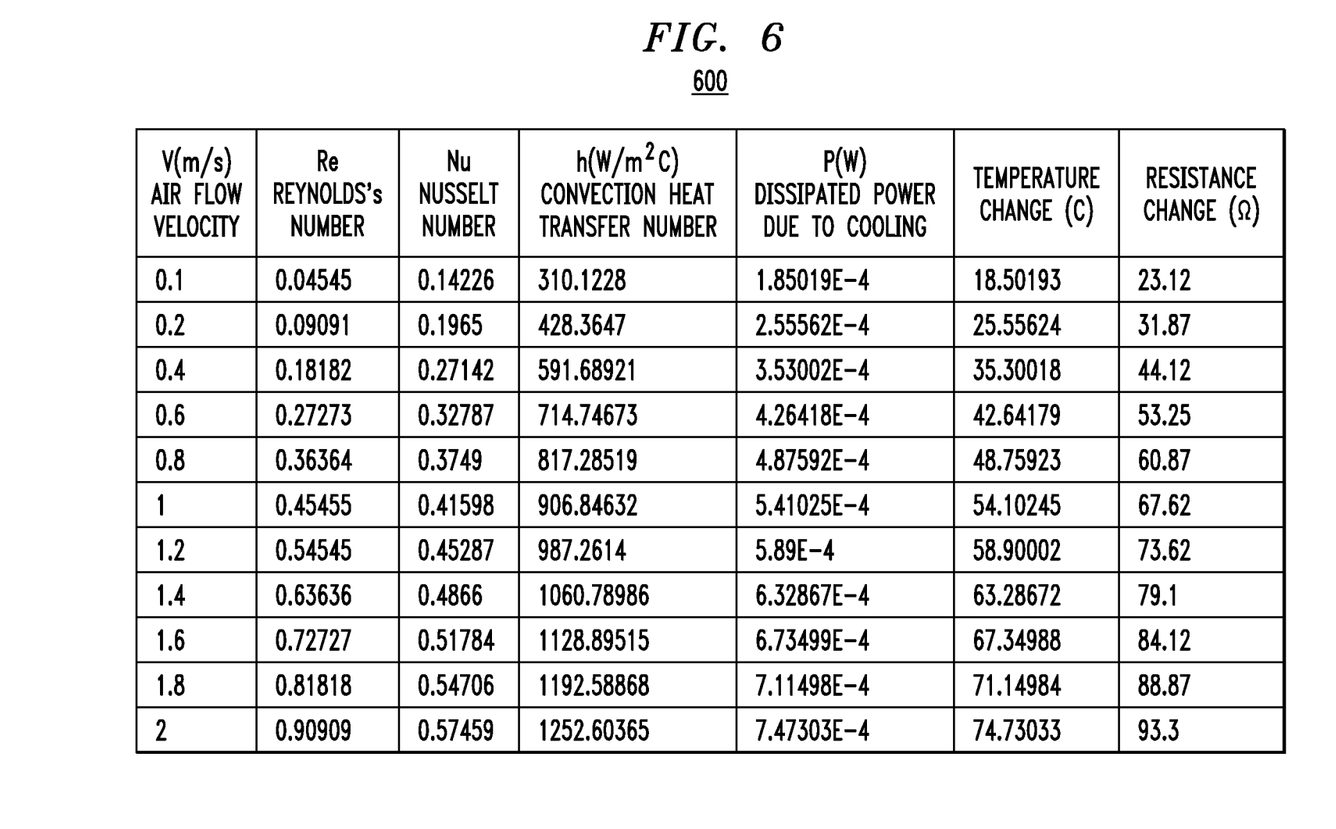
FIG. 6 is a table illustrating temperature changes due to a range of airflow velocities for an exemplary airflow sensor that may be used in the present airflow sensing units according to an embodiment of the present invention.

FIG. 6 is a table 600 illustrating temperature changes due to a range of airflow velocities for an exemplary airflow sensor that may be used in the present airflow sensing units. The airflow sensor used in this example is a millipede tip having a radius r of 20 μm and a thermal impedance of $1 \times 10^5$ K/W at a temperature T of 500° C. The following air parameters at atmospheric pressure were used: thermal conductivity $$k = 0.04360 \frac{W}{mC}$$

and Prandtl number Pr=0.680. The Reynold's coefficient Re may be represented as follows:

$$Re = \frac{V\left(\frac{m}{s}\right)d}{v}.$$

The Nusselt's coefficient Nu may be represented as follows:

$$Nu=0.683(Re)^{0.466}(Pr)^{0.333}.$$

The convection coefficient h (measured in W/(m²C) watts per square meter Celsius) may be represented as follows:

$$h = Nu\frac{k}{d}.$$

Dissipated power P (measured in watts (W)) may be represented as follows:

$$P=h\pi r^2 \Delta T,$$

wherein T is the change in temperature from 500° C. to room temperature. Once the dissipated power is known, the temperature change of the airflow sensor ($\Delta T_s$) can be extracted by multiplying the thermal impedance with the power (P). The change in resistance of the sensor is estimated by knowing the temperature coefficient of resistance (β) for doped silicon and its room temperature resistance ($R_0$):

$$\Delta R = R_0 \beta \Delta T_s.$$

Measured values of resistance change of the resistor due to air cooling are presented in FIG. 7, described below. The calculations are based on a simple convective cooling formula that takes into account the physical parameters of air and its flow characteristics. This simple model takes into account real measurement conditions and predicts a change in resistance of up to five percent (%) of the resistance value of the sensor. In this model a rectangular sample is assumed with dimensions determined by the size of a millipede tip airflow sensor heater (e.g., about five μm×about 20 μm) and a laminar airflow across the sample. As air at a constant temperature is flowed across the sample, some of the heat is removed and the sample will be cooled. The calculations performed are based on problems described, for example, in J. P. Holmes, "Heat transfer" McGraw Hill Book Company, pgs. 240-251, 1992, the contents of which are incorporated by reference herein. The sensors have the sensitivity to detect airflow from about two centimeters per second (cm/s) up to about five meters per second (m/s) which are typical values of airflow inside a data center.

Figure 7:
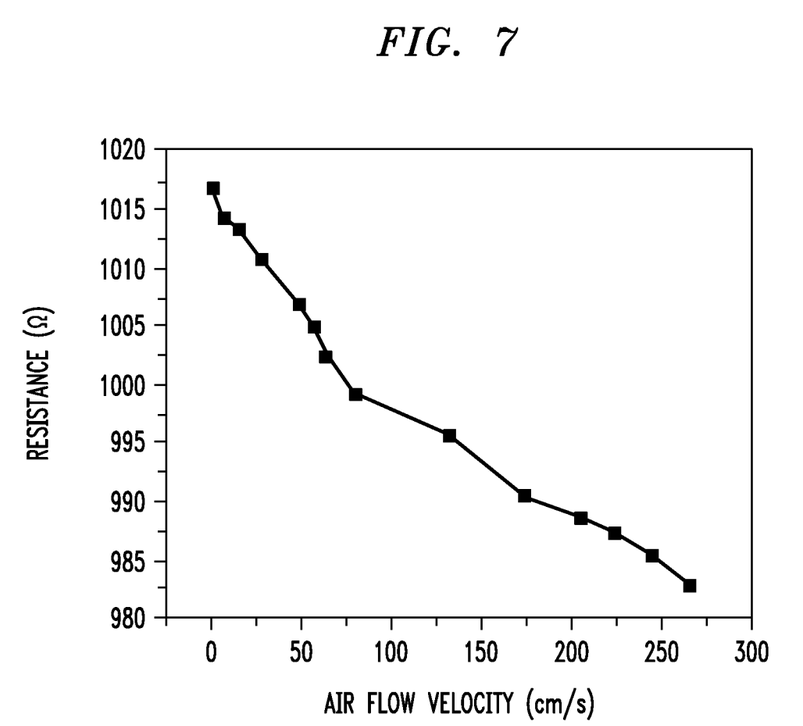
FIG. 7 is a graph illustrating resistance as a function of airflow velocity according to an embodiment of the present invention.

FIG. 7 is a graph illustrating resistance (measured in ohms (Ω)) as a function of airflow velocity (measured in cm/s). As illustrated in FIG. 7, measured values of resistance change as airflow across the sensor at a well defined velocity will cause a change in the resistance close to the expected values obtained from calculations. Thus, at a certain airflow velocity there will be a certain determined resistance change, and if the system is calibrated airflow velocity can be determined from resistance change. The change in resistance shown in FIG. 7 is large enough to be measurable with conventional electronic equipment (and can be further amplified, if necessary, e.g., through use of a voltage amplifier that would increase the signal). Furthermore, the resistance change is also linearly dependent on the airflow velocity assuring an easily detectable signal and calibration of the sensors.

The data presented in FIG. 7 was acquired with the airflow sensors having been warmed up to a temperature of 450° C. It is notable that the sensitivity of the measurements can be further improved by warming the sensors up to 550° C. Even when operating the sensors at 550° C., the power consumption is still less than two mW, orders of magnitude smaller than other commercially available sensors (this low power consumption makes MEMS an attractive option for integration in a mobile system (e.g., an MMT system) that has no extensive power supply). The data presented in FIG. 7 demonstrate the sensitivity in airflow measurement across a large range of air velocities employing the present sensors.

Figure 8:
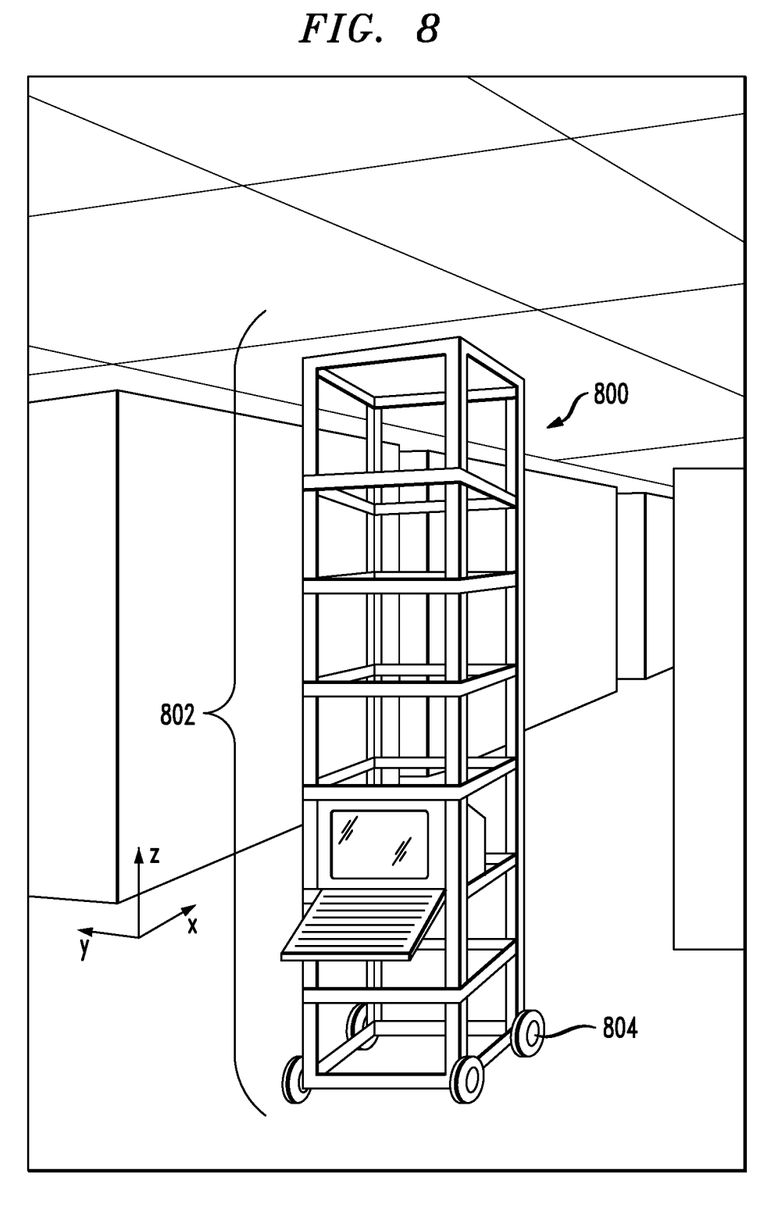
FIG. 8 is a diagram illustrating an exemplary mobile sensing device having an airflow sensing system that includes a grid of airflow sensing units according to an embodiment of the present invention.

FIG. 8 is a diagram illustrating exemplary mobile sensing device 800 having an airflow sensing system, such as airflow sensing system 500 (FIG. 5) that includes a grid 802 of airflow sensing units, such as airflow sensing unit 100 (FIG. 1). Mobile sensing device 800 is mounted on wheels 804 which permits mobile sensing device 800 to be moved around a room (e.g., data center) to take airflow measurements in various locations (see description below related, e.g., to taking measurements and moving the mobile sensing device along x- and y-axes throughout the data center). According to an exemplary embodiment, the grid is made up of vertical and horizontal metal bars that run parallel to each other on multiple levels above the ground (see FIG. 8). The airflow sensing units are mounted on the metal bar grid forming a grid-like arrangement of the airflow sensing units. The wheels may be attached directly to the bottom of the grid as shown in FIG. 8. Further, the control electronics that are used to control and take readings from the airflow sensors and/or to store and process airflow data (see control electronics 113 of FIG. 1, above) may also be attached to the grid, and thus accessible as the mobile sensing device is moved around the room. By way of example only, when an apparatus such as apparatus 1200 of FIG. 12, described below, serves as the control electronics, then the apparatus can also be mounted directly to the grid.

Figure 9:
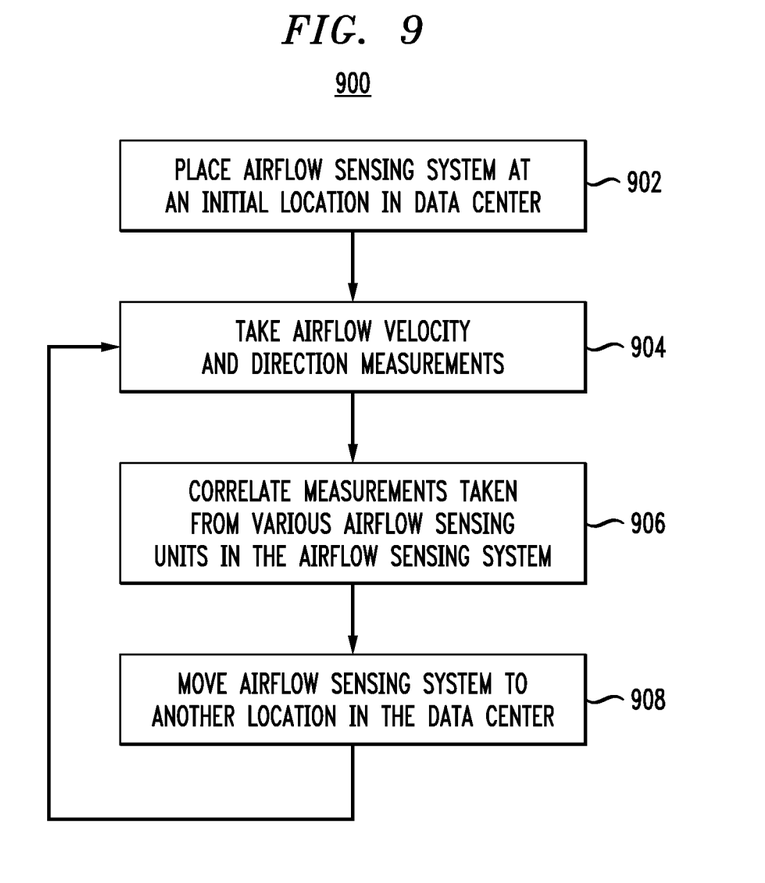
FIG. 9 is a diagram illustrating an exemplary methodology for taking airflow measurements of a room according to an embodiment of the present invention.

FIG. 9 is a diagram illustrating exemplary methodology 900 for taking airflow measurements of a room, such as a data center, using the present airflow sensing system, such as airflow sensing system 500 (FIG. 5), as part of a mobile sensing device, such as mobile sensing device 800 (FIG. 8). In step 902, the mobile sensing device is placed at an initial location in the data center. In step 904, airflow velocity (magnitude) and direction measurements are taken. According to an exemplary embodiment, the measurements are stored (e.g., by the control electronics) as is the location in the data center at which the measurements were taken. This allows the measurement data to be recalled at a later time, to be associated with a particular location in the data center and to be processed accordingly.

While each airflow sensing unit is configured to measure both airflow direction and velocity, it is for only one particular point on the grid. Thus, to gain an accurate airflow reading of the space surrounding the mobile sensing device, measurement data is taken from all of the airflow sensing units on the grid, and correlated. Specifically, in step 906, the measurements taken by the airflow sensing units on the grid are then correlated with each other. For example, if the mobile sensing device is not moving, changes in airflow across small distances can be monitored by correlating measurements taken from (vertically and/or horizontally) adjacent airflow sensing units on the grid.

The measurement correlation can be further explained using the following non-limiting example. Assume first that the direction and velocity of airflow is measured by the airflow sensing unit that is on the lower leftmost corner of the grid. One can then look to measurements made at the nearest neighbor airflow sensing unit to determine in which direction the air is flowing (most probably one airflow sensing unit is going to sense a larger airflow than the others). Thus, these two measurements can give an indication of the direction of airflow. Next, one can look to measurements made at the next nearest neighbor airflow sensing units of the first two airflow sensing units to analyze the airflow (based on the previous two measurements it can be estimated which airflow sensing unit would sense the largest airflow). It is an iterative process by which looking to the nearest airflow sensing unit neighbors the direction of an air stream that is flowing in the room can be traced. The air stream may enter the lower left corner (of the grid) but does not necessarily exit on the upper right corner (of the grid), e.g., it could change direction and exit on the right bottom corner depending on the air flow. By analyzing adjacent pairs of airflow sensing units the direction of the air stream can be determined.

Thus, airflow direction and velocity between two neighboring points can be determined iteratively to determine an overall air path between any two points in the data center. For example, airflow direction and velocity is first determined between first and second neighboring points. Next, airflow direction and velocity is then determined (iteratively) to a third point in the room, and so on, out to an outmost point x in the room.

In step 908, once the airflow velocity and direction measurements are made at the initial location, the mobile sensing device can be moved to another location. The movement of the mobile sensing device throughout the room can be coordinated by first dividing the room into a plurality of squares. Measurements are then made starting, for example, in a square at a corner of the room. The mobile sensing device is then moved to an adjacent square, for example, along either the x- or y-axes (see, for example, FIG. 8). By way of example only, if the mobile sensing device is moved to the adjacent square along the x-axis, then airflow measurements are taken from the position of that adjacent square. However, since measurements will be taken from various points on the grid (for example, measurements can be taken at each position in the room using all of the airflow sensing units on the grid) then data will also be collected regarding the airflow in directions other than the direction in which the mobile sensing device has been moved (in this case the mobile sensing device has been moved along the x-axis). Thus, data collected in this manner can also describe airflow along the y- and z-axes, as well as along the x-axis (see FIG. 8). Techniques for determining directional airflow using adjacent pairs of airflow sensing units on the grid were described in detail above. Further, the measurements made can be recorded and the recorded measurement data associated with a given position in the room at which the measurements were taken. The data can later be recalled and correlated in any manner desired, even if the data was not acquired sequentially during the scan. For example, assume a large airflow is measured with a particular airflow sensing unit on the grid at a certain location in the room. If when the mobile sensing device is moved to the next square and the same airflow sensing unit does not register any airflow then it can be deduced that the direction of the airflow has changed. To figure out the new direction of the airflow, measurements from the nearest neighbor airflow sensing unit (as described above) can be analyzed to see how the air direction changed.

Figure 12:
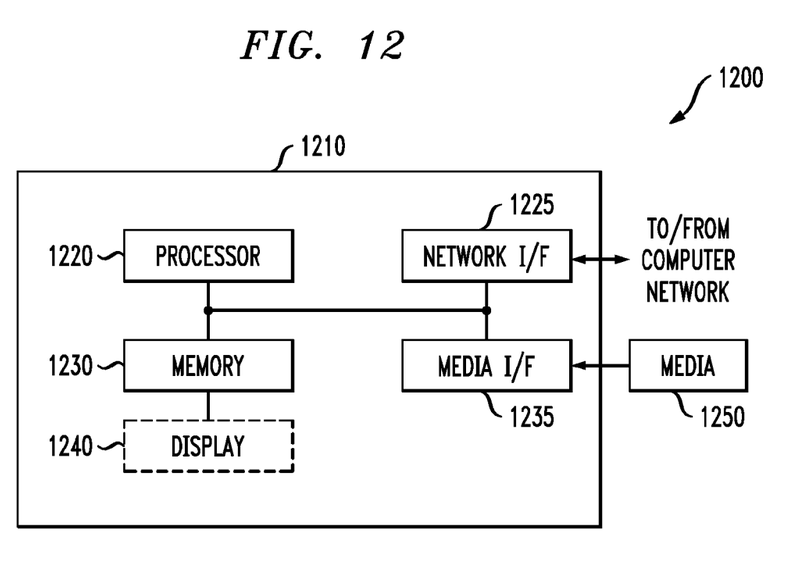
FIG. 12 is a diagram illustrating an exemplary apparatus for implementing one or more of the present methodologies according to an embodiment of the present invention.

Measurements can again be taken and correlated, as in steps 904 and 906, respectively. In this manner, the mobile sensing device can be moved around the room (data center) to map out an airflow distribution across the entire space (rendering a three-dimensional map of airflow change in the data center). While correlations can be made as soon as the measurement data is acquired, it is also possible to make airflow measurements at the various locations throughout the data center and store that measurement data along the locations of the grid. Once all of the measurements have been taken, then the stored data can be processed (i.e., correlated). The data can be processed using, for example, apparatus 1200 when apparatus 1200 is configured to serve as the control electronics for the airflow sensors (see below).

In many applications like data centers, multiple air inlets exist. That combined with obstacles that block airflow can lead to rapid changes in local airflow. Furthermore, even rapid local temperature variations can change the velocity and direction of an air stream over very short distances.

Figure 10:
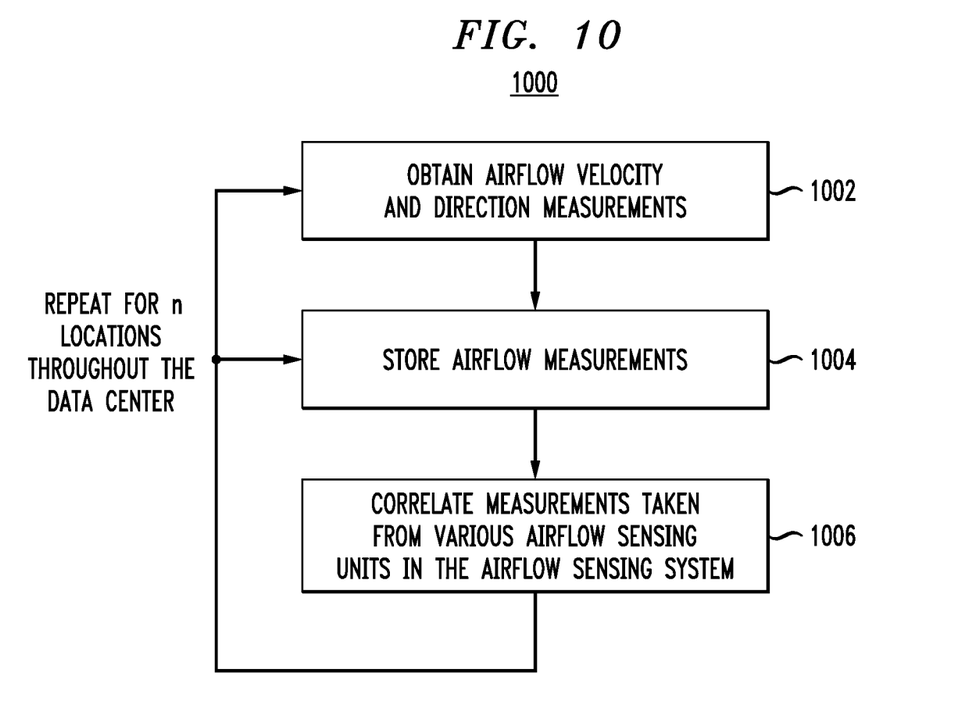
FIG. 10 is a diagram illustrating an exemplary methodology for airflow analysis in a room according to an embodiment of the present invention.

As highlighted above, the control electronics (i.e., control electronics 113 of FIG. 1) for the airflow sensing units may be embodied in an apparatus such as apparatus 1200 of FIG. 12 (described below) configured to perform one or more of the functions associated with the control electronics, e.g., storing and processing airflow measurement data. Thus, by way of example only, the apparatus of FIG. 12 may be configured to perform one or more of the steps of the following methodology 1000 of FIG. 10. FIG. 10 is a diagram illustrating exemplary methodology 1000 for airflow analysis in a room, such as a data center. Methodology 1000 represents, for example, the steps that can be performed by the control electronics in conjunction with methodology 900 of FIG. 9 (described above). In step 1002, airflow velocity (magnitude) and direction measurements are obtained (from the airflow sensing units) for a particular location in the data center. According to an exemplary embodiment, in step 1004 the measurements are stored (e.g., in a memory of the control electronics) as is the location in the data center at which the measurements were taken. This allows the measurement data to be recalled at a later time, to be associated with a particular location in the data center and to be processed accordingly. Steps 1002 and 1004 can be repeated for n number of locations throughout the room.

In step 1006, the measurements taken by the airflow sensing units on the grid (see description of FIG. 9, above) are then correlated with each other. For example, if the mobile sensing device is not moving, changes in airflow across small distances can be monitored by correlating measurements taken from (vertically and/or horizontally) adjacent airflow sensing units on the grid. Airflow measurement correlation was described in detail in conjunction with the description of FIG. 9, above. For example, airflow direction and velocity between two neighboring points can be determined iteratively to determine an overall air path between any two points in the room (see above). Alternatively, if the airflow measurement data was stored along with the particular location at which the measurements were taken, then this correlation step can be performed at a later time, e.g., after some or all of the measurements throughout the room have been taken.

Figure 11:
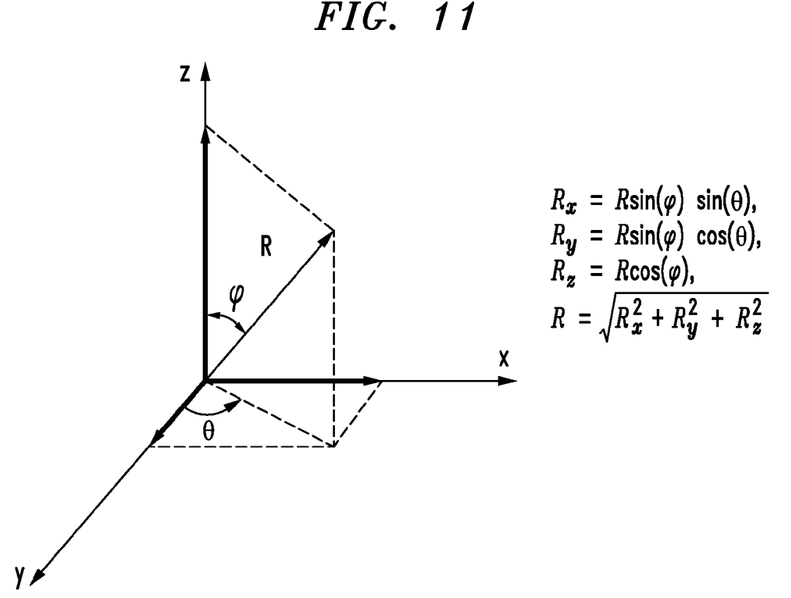
FIG. 11 is a diagram illustrating airflow reconstruction from measured airflow along three directions according to an embodiment of the present invention.

FIG. 11 is a diagram illustrating how by measuring the airflow along three directions for a single point on the grid, the air flow at that point can be reconstructed by adding all three components. Assume, for example, that there is a vector with magnitude R and oriented in space as determined by two angles $\phi$ and $\theta$. The component along three orthogonal directions can be determined as:

$$R_x = R\sin(\varphi)\sin(\theta),$$
$$R_y = R\sin(\varphi)\cos(\theta),$$
$$R_z = R\cos(\varphi),$$
$$R = \sqrt{R_x^2 + R_y^2 + R_z^2},$$

wherein Rx, Ry and Rz are the three components. Basically, in the present teachings the three components Rx, Ry, and Rz of the airflow are measured using the airflow sensing units and then the inverse of the above problem is used to reconstruct R, and to obtain $\theta$ and $\phi$. Once R, $\theta$, and $\phi$ are known the magnitude and direction of the airflow (vector) in the space is known. Thus, the components are measured and the airflow is reconstructed from the component data. By way of example only, the airflow sensing units are used to measure the magnitude and direction of the airflow through a given air passage. Once all of the elements are known, R, $\theta$ and $\phi$ can be obtained.

Turning now to FIG. 12, a block diagram is shown of an apparatus 1200 for implementing one or more of the methodologies presented herein. By way of example only, as highlighted above, apparatus 1200 can serve as the control electronics (i.e., control electronics 113 of FIG. 1) for the airflow sensing units, and can store and process the airflow measurement data obtained therefrom. Thus, according to an exemplary embodiment, apparatus 1200 can be used for airflow analysis and configured to implement methodology 1000 of FIG. 10.

Apparatus 1200 comprises a computer system 1210 and removable media 1250. Computer system 1210 comprises a processor device 1220, a network interface 1225, a memory 1230, a media interface 1235 and an optional display 1240. Network interface 1225 allows computer system 1210 to connect to a network, while media interface 1235 allows computer system 1210 to interact with media, such as a hard drive or removable media 1250. When, for example, apparatus 1200 serves as the control electronics for the airflow sensing units, apparatus 1200 can interface with the airflow sensing units by way of wired connections (for example as shown in FIG. 1) or alternatively by way of one or more wireless connections (not shown).

As is known in the art, the methods and apparatus discussed herein may be distributed as an article of manufacture that itself comprises a machine-readable medium containing one or more programs which when executed implement embodiments of the present invention. For instance, according to the exemplary embodiment, wherein apparatus 1200 serves as the control electronics for the airflow sensing units and is configured to implement methodology 1000 of FIG. 10 (a method for airflow analysis in a room), the machine-readable medium may contain a program configured to obtain airflow direction and velocity measurements for a given location in the room from a mobile sensing device having an airflow sensing system having a plurality of airflow sensing units arranged in a grid, each airflow sensing unit including a first air passage that contains at least one first airflow sensor; a second air passage perpendicular to the first air passage, wherein the second air passage contains at least one second airflow sensor; and a third air passage perpendicular to the first air passage and the second air passage, wherein the third air passage contains at least one third airflow sensor; determine airflow direction and velocity between two neighboring points iteratively to determine an overall air path between any two points in the room; and repeat the obtaining and determining steps for n number of locations throughout the room to map airflow in the entire room.

The machine-readable medium may be a recordable medium (e.g., floppy disks, hard drive, optical disks such as removable media 1250, or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used.

Processor device 1220 can be configured to implement the methods, steps, and functions disclosed herein. The memory 1230 could be distributed or local and the processor device 1220 could be distributed or singular. The memory 1230 (which as described above can store measurement data) could be implemented as an electrical, magnetic or optical memory, or any combination of these or other types of storage devices. Moreover, the term "memory" should be construed broadly enough to encompass any information able to be read from, or written to, an address in the addressable space accessed by processor device 1220. With this definition, information on a network, accessible through network interface 1225, is still within memory 1230 because the processor device 1220 can retrieve the information from the network. It should be noted that each distributed processor that makes up processor device 1220 generally contains its own addressable memory space. It should also be noted that some or all of computer system 1210 can be incorporated into an application-specific or general-use integrated circuit.

Optional video display 1240 is any type of video display suitable for interacting with a human user of apparatus 1200. Generally, video display 1240 is a computer monitor or other similar video display.

Although illustrative embodiments of the present invention have been described herein, it is to be understood that the invention is not limited to those precise embodiments, and that various other changes and modifications may be made by one skilled in the art without departing from the scope of the invention.

What is claimed is:

1. A mobile sensing device, comprising:
an airflow sensing system having a plurality of airflow sensing units arranged in a grid, each of the airflow sensing units comprising:
a first air passage that contains at least one first airflow sensor;
a second air passage perpendicular to the first air passage, wherein the second air passage contains at least one second airflow sensor; and a third air passage perpendicular to the first air passage and the second air passage, wherein the third air passage contains at least one third airflow sensor, wherein each of the airflow sensing units is configured to measure airflow direction and velocity in three dimensions, wherein one or more of the at least one first airflow sensor, the at least one second airflow sensor and the at least one third airflow sensor comprise a thermal micro electro mechanical sensor having i) a central leg with a first heater incorporated into a constant temperature feedback loop and ii) a lateral leg with a second heater which, during operation, is powered at constant voltage, and wherein the thermal micro electro mechanical sensor is sensitive to airflow with a velocity distribution across a range of from about 1 cm/s to about 5 m/s; and wherein each of the airflow sensors is configured to be self-heating while having a total power consumption of less than about two milliwatts, wherein each of the airflow sensors comprises two heaters which are configured such that a differential signal is obtained based on a differential resistance between the two heaters which varies depending on a direction of the airflow, and wherein a change in the airflow due to heat dissipated by the airflow sensors does not affect an overall airflow measurement provided by the airflow sensing system.

2. The mobile sensing device of claim 1, wherein for each of the airflow sensing units the first air passage is positionable along an x-axis, the second air passage is positionable along a y-axis and the third air passage is positionable along a z-axis.

3. The mobile sensing device of claim 2, wherein for each of the airflow sensing units the first airflow sensor is configured to detect airflow direction and velocity along the x-axis, the second airflow sensor is configured to detect airflow direction and velocity along the y-axis and the third airflow sensor is configured to detect airflow direction and velocity along the z-axis.

4. The mobile sensing device of claim 1, wherein for each of the airflow sensing units each air passage comprises a tube having a diameter of from about 0.1 centimeters to about five centimeters.

5. The mobile sensing device of claim 1, wherein for each of the airflow sensing units each air passage contains a pair of airflow sensors.

6. The mobile sensing device of claim 5, wherein for each of the airflow sensing units each air passage contains a tilted blocking bar on which the pair of airflow sensors are positioned, the tilted blocking bar being configured to direct air flowing in a particular direction to a particular one of the pair of sensors such that during operation of the device, depending on a direction of an airflow one of the pair of airflow sensors will sense the airflow while another of the pair of airflow sensors will be idle.

7. The mobile sensing device of claim 1, wherein the airflow sensing units of the airflow sensing system have a same orientation along an x-axis, a y-axis and a z-axis as one another.

8. The mobile sensing device of claim 1, further comprising a metal bar grid on which the plurality of airflow sensing units are mounted.

9. The mobile sensing device of claim 8, further comprising wheels attached to a bottom of the metal bar grid.

10. The mobile sensing device of claim 1, wherein the grid comprises 10 different height levels with 10 lateral locations at each height level.

11. The mobile sensing device of claim 10, comprising the airflow sensing units in at least 100 different locations on the grid.

12. The mobile sensing device of claim 1, further comprising control electronics configured to control the airflow sensors, take readings from the airflow sensors, store data obtained from the airflow sensors and process data obtained from the airflow sensors.

13. A method for mapping the airflow of a room by taking airflow measurements of the room, the method comprising the steps of:

placing a mobile sensing device at an initial location in the room, the mobile sensing device comprising an airflow sensing system having a plurality of airflow sensing units arranged in a grid, each of the airflow sensing units comprising a first air passage that contains at least one first airflow sensor; a second air passage perpendicular to the first air passage, wherein the second air passage contains at least one second airflow sensor; and a third air passage perpendicular to the first air passage and the second air passage, wherein the third air passage contains at least one third airflow sensor, wherein each of the airflow sensing units is configured to measure airflow direction and velocity in three dimensions, wherein one or more of the at least one first airflow sensor, the at least one second airflow sensor and the at least one third airflow sensor comprise a thermal micro electro mechanical sensor having i) a central leg with a first heater incorporated into a constant temperature feedback loop and ii) a lateral leg with a second heater which, during operation, is powered at constant voltage, and wherein the thermal micro electro mechanical sensor is sensitive to airflow with a velocity distribution across a range of from about 1 cm/s to about 5 m/s, and wherein each of the airflow sensors is configured to be self-heating while having a total power consumption of less than about two milliwatts, wherein each of the airflow sensors comprises two heaters which are configured such that a differential signal is obtained based on a differential resistance between the two heaters which varies depending on a direction of the airflow, and wherein a change in the airflow due to heat dissipated by the airflow sensors does not affect an overall airflow measurement provided by the airflow sensing system;

measuring airflow direction and velocity using the mobile sensing device;

moving the mobile sensing device to another location in the room; and repeating the measuring and moving steps to obtain airflow measurements throughout the room thereby mapping the airflow of the room.

14. The method of claim 13, wherein the room is a data center.

15. The method of claim 13, further comprising the step of:
determining airflow direction and velocity between two points iteratively to determine an overall air path between any two points in the data center.

16. The method of claim 15, wherein the determining step is performed after the airflow direction and velocity are measured at each location.

17. The method of claim 15, wherein the determining step is performed after the airflow direction and velocity are measured at one or more locations in the data center.

18. A method for airflow analysis in a room, comprising the steps of:

obtaining airflow direction and velocity measurements for a given location in the room from a mobile sensing device comprising an airflow sensing system having a plurality of airflow sensing units arranged in a grid, each of the airflow sensing units comprising a first air passage that contains at least one first airflow sensor; a second air passage perpendicular to the first air passage, wherein the second air passage contains at least one second airflow sensor; and a third air passage perpendicular to the first air passage and the second air passage, wherein the third air passage contains at least one third airflow sensor, wherein each of the airflow sensing units is configured to measure airflow direction and velocity in three dimensions, wherein one or more of the at least one first airflow sensor, the at least one second airflow sensor and the at least one third airflow sensor comprise a thermal micro electro mechanical sensor having i) a central leg with a first heater incorporated into a constant temperature feedback loop and ii) a lateral leg with a second heater which, during operation, is powered at constant voltage, and wherein the thermal micro electro mechanical sensor is sensitive to airflow with a velocity distribution across a range of from about 1 cm/s to about 5 m/s, wherein each of the airflow sensors is configured to be self-heating while having a total power consumption of less than about two milliwatts, wherein each of the airflow sensors comprises two heaters which are configured such that a differential signal is obtained based on a differential resistance between the two heaters which varies depending on a direction of the airflow, and wherein a change in the airflow due to heat dissipated by the airflow sensors does not affect an overall airflow measurement provided by the airflow sensing system;

determining airflow direction and velocity between two points iteratively to determine an overall air path between any two points in the room, wherein the overall air path is determined based on correlating measurements taken in pairs from the airflow sensing units wherein a determination is made as to which of the airflow sensing units senses a larger airflow than one or more other of the airflow sensing units; and repeating the obtaining and determining steps for n number of locations throughout the room to map airflow in the entire room.

19. The method of claim 18, further comprising the steps of:

storing the airflow direction and velocity measurements; and repeating the obtaining and storing steps for n number of locations throughout the room.

20. The method of claim 18, wherein the room is a data center.

21. The method of claim 18, wherein the mobile sensing device further comprises control electronics having a memory and at least one processor device, coupled to the memory, the processor device operative to perform the obtaining, determining and repeating steps.

* * * * *